United States Patent [19]
Weichel

[11] 3,822,617

[45] July 9, 1974

[54] APPARATUS FOR CONTINUOUS TRANSFER OF A MATERIAL ROPE FROM A PILE TO A FOLLOWING DEVICE

[76] Inventor: Ernst Weichel, Postfach 30, 7326 Heiningen, Germany

[22] Filed: Sept. 22, 1972

[21] Appl. No.: 291,210

[52] U.S. Cl. .................. 82/2.5, 83/155, 83/433, 83/490, 83/701, 83/733
[51] Int. Cl. ............................................ B26d 3/28
[58] Field of Search ..... 82/2.5; 83/490, 701, 411 R, 83/155, 733, 433, 434; 214/17 A, 17 D, 17 DA, 17 DB; 222/80; 241/101 R, 101.4

[56] References Cited
UNITED STATES PATENTS

| | | | |
|---|---|---|---|
| 2,678,241 | 5/1954 | Miller | 214/17 DB |
| 3,545,511 | 12/1970 | Weichel | 83/5 |

Primary Examiner—J. M. Meister
Attorney, Agent, or Firm—Toren, McGeady & Stanger

[57] ABSTRACT

Leaf and stalk feed material, piled on a rotatable turntable, is removed in a continuous rope-like form by a cutting tool supported on one end of a boom. The boom is pivotally mounted at one end so that its other end supporting the cutting tool can swing inwardly from the outer circumferential periphery of the turntable toward its center as the cutting tool removes the material from the pile and directs it into a conveyor duct extending along the boom from its free end to its pivoted end. The drive arrangements for the boom, the cutting tool and the turntable can be interrelated to afford coordinated operation in removing the material from the turntable as the cutting tool swings inwardly and for returning the cutting tool to its starting position when the material has been completely removed from the turntable.

30 Claims, 10 Drawing Figures

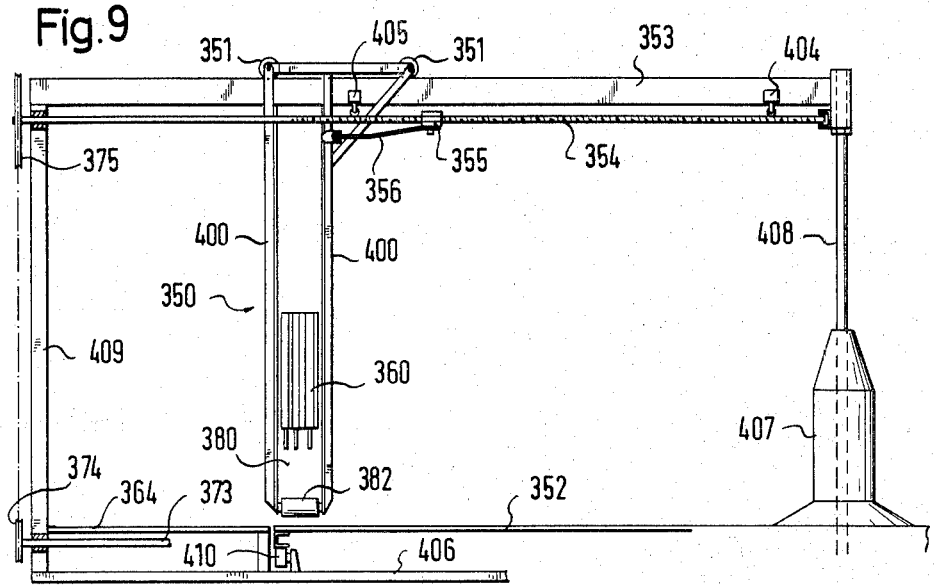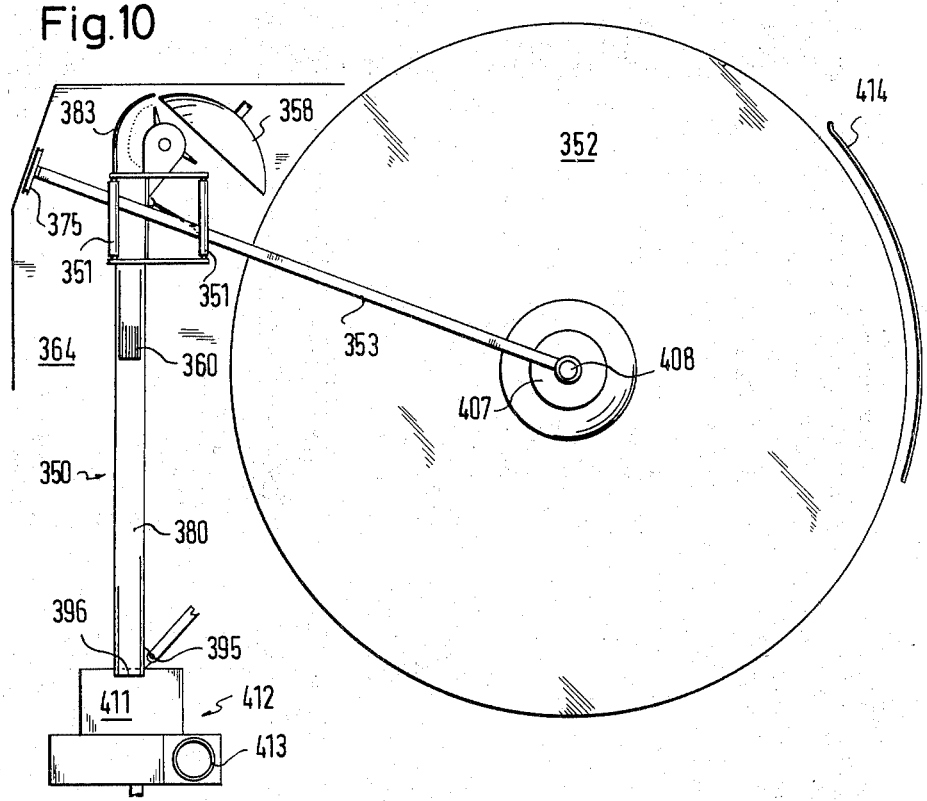

APPARATUS FOR CONTINUOUS TRANSFER OF A MATERIAL ROPE FROM A PILE TO A FOLLOWING DEVICE

The invention relates to an apparatus for the intermediate storage and continuous conveyance of leaf and stalk feed material by means of a turntable designed as a rotating platform and of a cutting element, which changes its position relative to the material to be cut and to the bearing surface resp. for the material to be cut and severs partial amounts continuously from a rotating pile to conduct them to a following conveyer device.

Particularly in the last mentioned patent application it has already been suggested to arrange the cutting tool on a boom swinging in a horizontal plane, which leads from the periphery to the center of the rotating bearing surface and to effect this swinging movement by mechanical, hydraulic or pneumatic drives.

The invention solves the problem of improving the apparatus described in the above mentioned patent application particularly the problem of improving the performance of the cutting tool with any type of material to be conveyed and of ensuring the trouble-free conveyance of the material severed from the pile to the following (stationary) conveyer arranged outside the rotating bearing surface in any position of the cutting tool.

The invention solves this problem in apparatus for the continuous transfer of a material rope, which was severed by a cutting tool moving on a swing boom from a pile arranged on a rotating bearing surface to a following device in that the swing boom carries a conveyer device and that cutting roll is connected at its free end to a turning gear which turns it from the periphery to about the center of the rotating bearing surface. Preferably, the conveyer has at least one chain provided with prongs or at least one revolving belt.

The conveyer can also have at least one conveyer screw.

The swing boom is preferably connected over a linkage to the turning gear. The turning gear is in driving connection with the drive of the bearing surface or with the latter itself over a preferably disconnectable reduction gear.

In a particularly advantageous embodiment the conveyer is designed as a conveying duct arranged on the boom, in which the drivers of the revolving conveyer chains or bolts rotate.

The axles or rollers of the conveyer chains or belts are preferably perpendicular to the bottom of the conveying duct. The free end of the boom or of the conveying duct preferably bears on guide rollers for which a stationary pedestal arranged next to the rotatable bearing surface at the same level serves as a track.

The turning gear can mostly be driven with a regulable or progressive rate of feed and can also be driven or disconnected additionally by hand.

Preferably the cutting tool is so arranged on a supporting arm arranged in an angle to the swing boom that its cutting point, seen in a top view, is laterally next to and between the free end and the fulcrum of the swing boom.

The fulcrum of the swing boom is according to one feature of the invention higher than the plane of the rotating bearing surface so that the conveying duct extends from the cutting disk rising in the direction of the fulcrum.

According to another feature, the turning gear is connected to a switching device which automatically stops the drives of the turntable and of the conveyer and/or cutting tool in dependence on the end position of the cutting tool in the proximity of the center of the bearing surface.

The prongs of the conveyer chain or the drivers of the conveyer belts engage the side walls of the conveying duct through slots in the latter.

The conveying duct has preferably in its cross section the form of an upright rectangle.

Preferably a pressure or feed roller rotating about a substantially horizontal axis is arranged above the inlet port of the conveying duct facing the cutting disk.

According to another feature of the invention, the conveyer device and the turntable are always driven jointly by the same power source and the cutting tool is provided with a drive which can be connected and disconnected independent of the other drives.

In order to eliminate the disadvantage that the guide rollers supporting the free end of the conveyers on the turntable stress the turntable and run with more difficulty through feed residues or not always at the same height with the turntable, rollers are provided according to another feature of the invention above the free end of the boom which run on a gantry type carrier arranged radially to the stationary turntable in which carrier is mounted a driven spindle which moves a spindle nut which is connected over a rod to the boom.

In order to avoid the disadvantage that the turning gear does not effect a exactly uniform swivel movement of the conveyer and that the thickness of the rope is smaller during the peeling at the periphery of the turntable than during the peeling in the center of the turntable and that clogging may occur when the material rope moves on with a relatively great height of charge of the material pile the gear is equipped according to another feature of the invention with a speed adjusting device to adjust the swing boom.

According to another feature of the invention the cutting disk is associated with a known conveying drum and a driven packing element is arranged behind it which reduces the height of the severed material rope and transfers it to a chain- or belt conveyer arranged in the bottom of the conveying duct.

Preferably the gear parts are secured on a detachable frame which is mounted protected under a pedestal and on which is arranged at least one electromotor one step pulley V-belt reduction gear two variable drive pulleys, one worm gear and one friction roller mounted on a rocker and one counter roller associated with the latter.

The extension of the worm shaft of the worm gear carries preferably a belt pulley which is in driving connection with a counter pulley on the adjusting spindle mounted in the gantry type carrier.

According to another feature of the invention a driven shaft of the drive is equipped with a free wheeling device and the driving motor is designed as a two stage motor which can be switched into two directions of rotation and which drives the horizontal spindle with the higher speed of rotation when switched to reverse, while the other parts of the turntable drive are made temporarily inoperative by the freewheeling device.

According to another feature of the invention the conveying drum associated with the cutting disk has several rows of controlled prongs which pierce into the outer edge of the revolving pile ahead of the cutting disk and which pull out laterally from the feed contained in a deflecting conveying duct ahead of the start of the outlet duct and the bottom of the outlet duct is provided with a conveyer belt or a conveyer chain whose guide roller closest to the cutting disk starts behind the path of motion of the prongs of the conveying drum associated with the cutting disk, so that the deflecting conveyer is open at the bottom in the range of the cutting disk and immediately behind it.

According to another feature of the invention the packing element arranged in the outlet duct and preferably designed as a conveying drum or conveying chain is provided with prongs which revolve about axles arranged horizontally and transverse to the conveying direction of the conveying duct and which dip from the front or from the top into the material to be conveyed so that that reduce the height of the material rope moving in the deflecting conveying duct and pull out at the top from the outlet duct at the end of their path.

The length of the outlet duct is preferably a multiple of the length of the packing element considered in a top view and the prongs of the packing element are pulled out at the top through slots of a cover of the outlet duct.

It is advisable to arrange the packing element with limited vertical adjustment so that it can move upward under the influence of large amounts of material.

Other features of the invention will result from the following description of the embodiments on the basis of the drawings, FIGS. 1 to 10, in which several embodiments are represented which will be so described below that features which are shown or described in only one embodiment can be considered as applicable to other embodiments too.

FIG. 9 shows a partial view in a partial section.

FIG. 10 shows a schematic top view of another embodiment with following devices.

Figure 1:
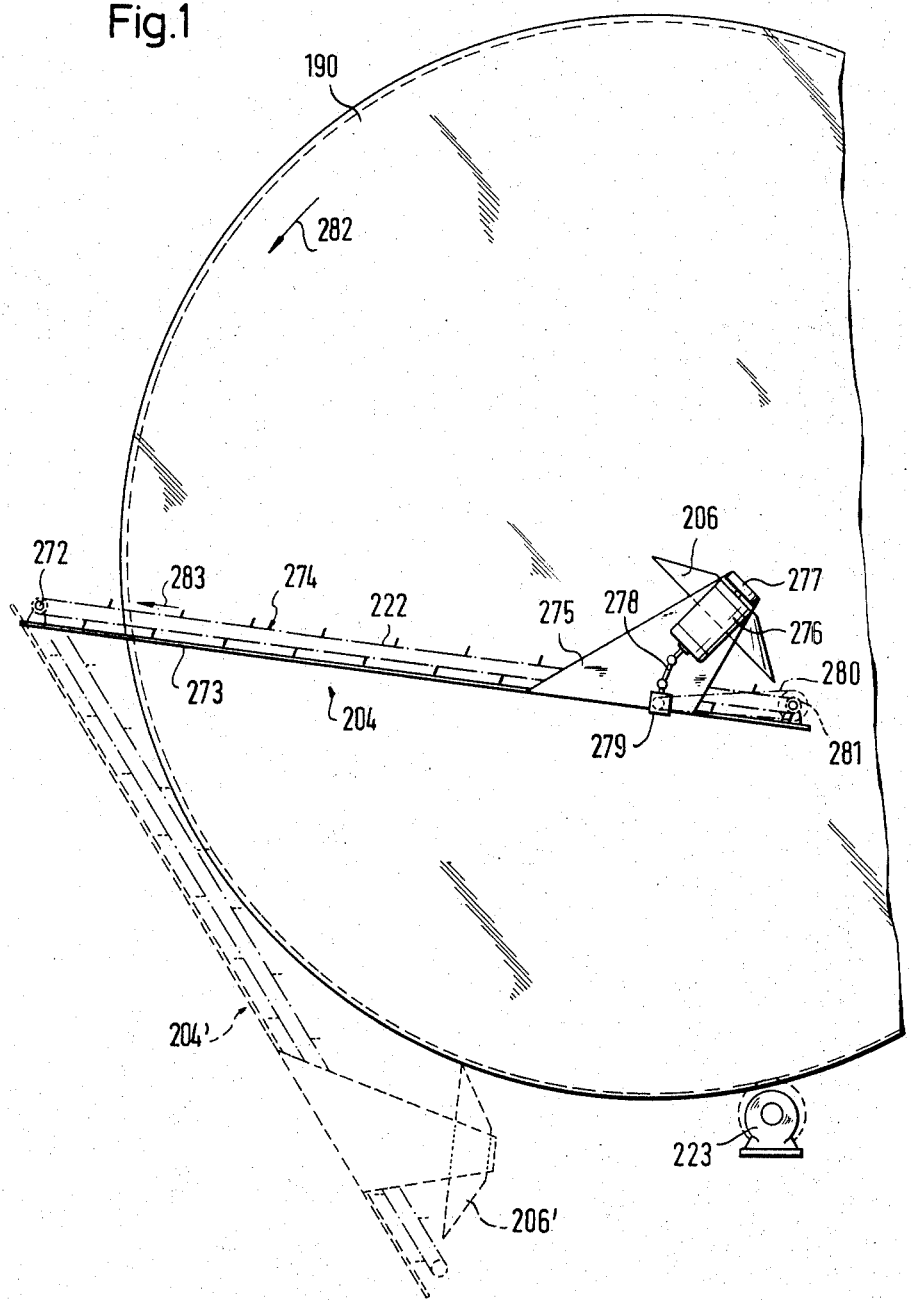
FIG. 1 shows a schematic partial top view of an embodiment.

FIG. 1 shows a rotating bearing surface for the material to be conveyed, a turntable 190 which is set in rotation by a driving motor 223 and a boom 204 which swings about a fixed point 272. The boom 204 has a frame 273 which can be designed as a protective wall and a conveyer 274 arranged thereon and provided with revolving elements. On the frame 273 is arranged a bridge 275 which carries a pot-shaped cutting disk 206 arranged at an angle to the frame 274 and to the boom 204, resp., which disk is driven by a driving motor 276 over a back gear 277. The driving motor is connected over a cardan shaft 278 to a gear 279 from which the guide roller 281 of the conveying chain 222 is driven over a back gear 280.

As it can be seen, the conveyer chain which can have several superposed strands with prongs, rotates about substantially vertical axes. It forms, therefore, together with the frame 273 a conveyer wall provided with conveyer elements toward which the turntable 190 rotating in the direction of the arrow 282 pushes the material severed by the cutting disk 206 from the revolving pile so that it is moved to the outside by the strand of the conveyer chain 222 rotating in the direction of the arrow 283 in any position of the cutting disk 206 and of the boom 204 resp. away from the turntable 190. The following conveyer devices which are not shown, are arranged in the proximity of the fixed point 272. The boom 204 is shown in the inner end position in solid lines, the broken line represent the position 204', 206' of the boom and of the cutting disk, resp., at the start of the removal of material from a pile which has been placed first on the turntable by means of a vehicle or any other conveyer device.

Figure 2:
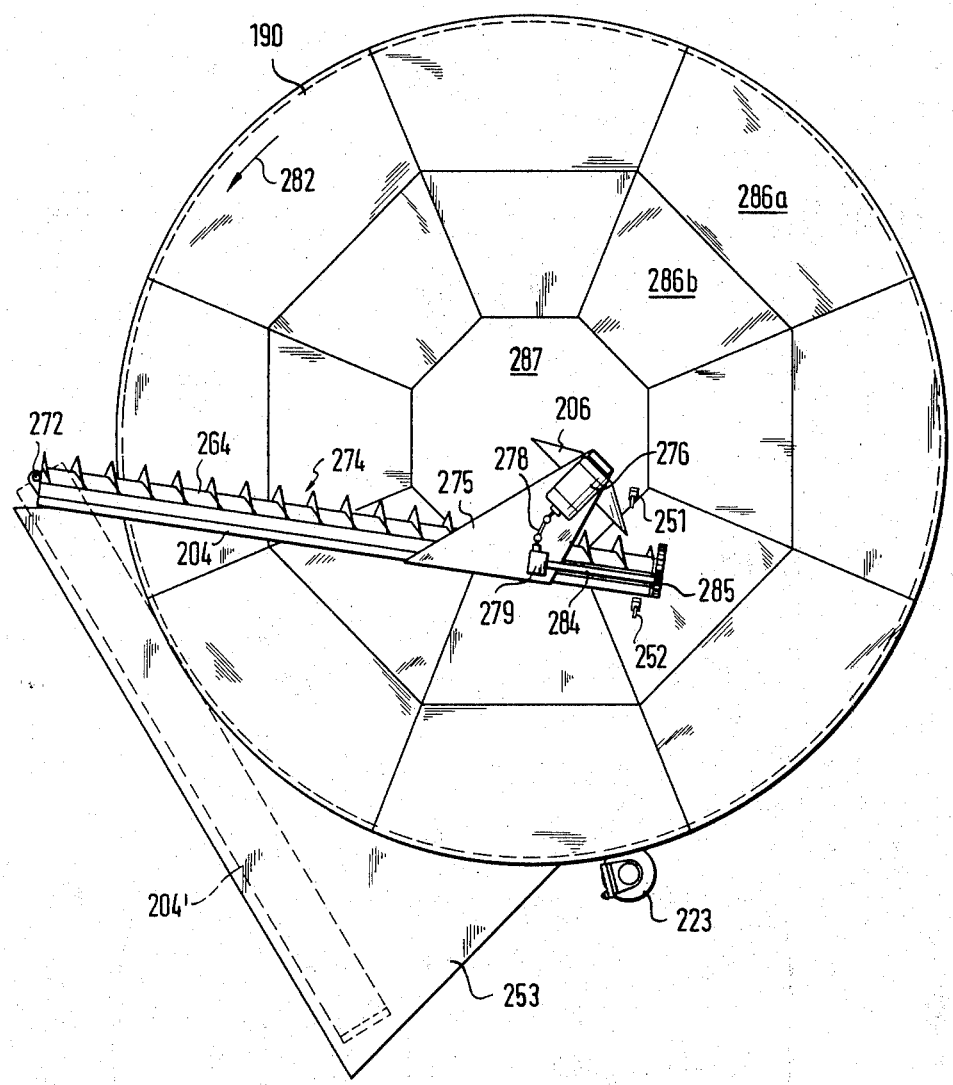
FIG. 2 shows a schematic top view of another embodiment.

FIG. 2 shows a similar embodiment in which the boom 204 is likewise provided with the bridge 275 which carries the cutting disk 206. As a conveyer device 274 arranged on the boom 204 is used a conveyer screw 264. The boom is indicated in phantom in its extreme position 204'; in this position it is above a stationary pedestal 253 on which guide rollers 251 and 252 arranged on the boom 204 (which are shown only in the inner position in solid lines) can rotate when they are outside the turntable 190 which consists of segments 286a, 296b and of a center piece 287. The motor 276 the cardan shaft 278 and the gear 279 are arranged in a manner similar to FIG. 1. A shaft 284 leads from the gear 279 to the back gear 285 which drives the screw 264 in a known manner. The manufacture of the turntable from segments 286a, 286b and a polygonal center piece 287 permits the series production of the parts of the turntable 190 from single parts as well as favorable transportation in the disassembled state.

Figure 3:
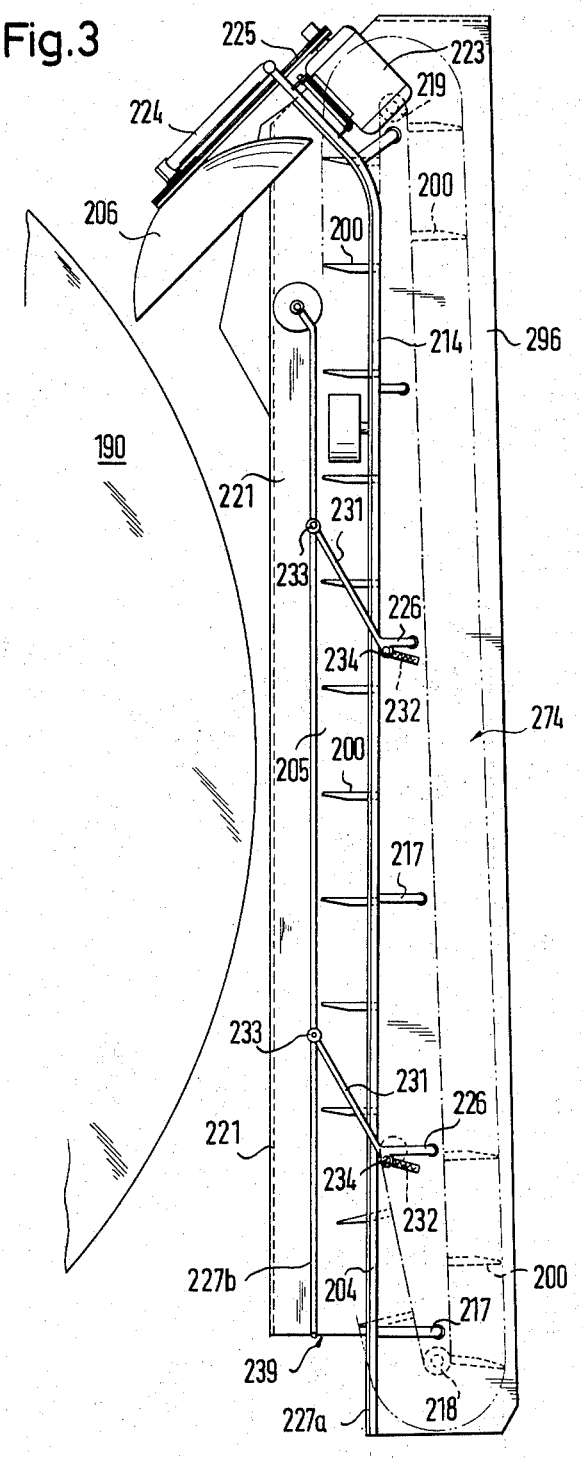
FIG. 3 shows a schematic partial top view of another embodiment.
Figure 4:
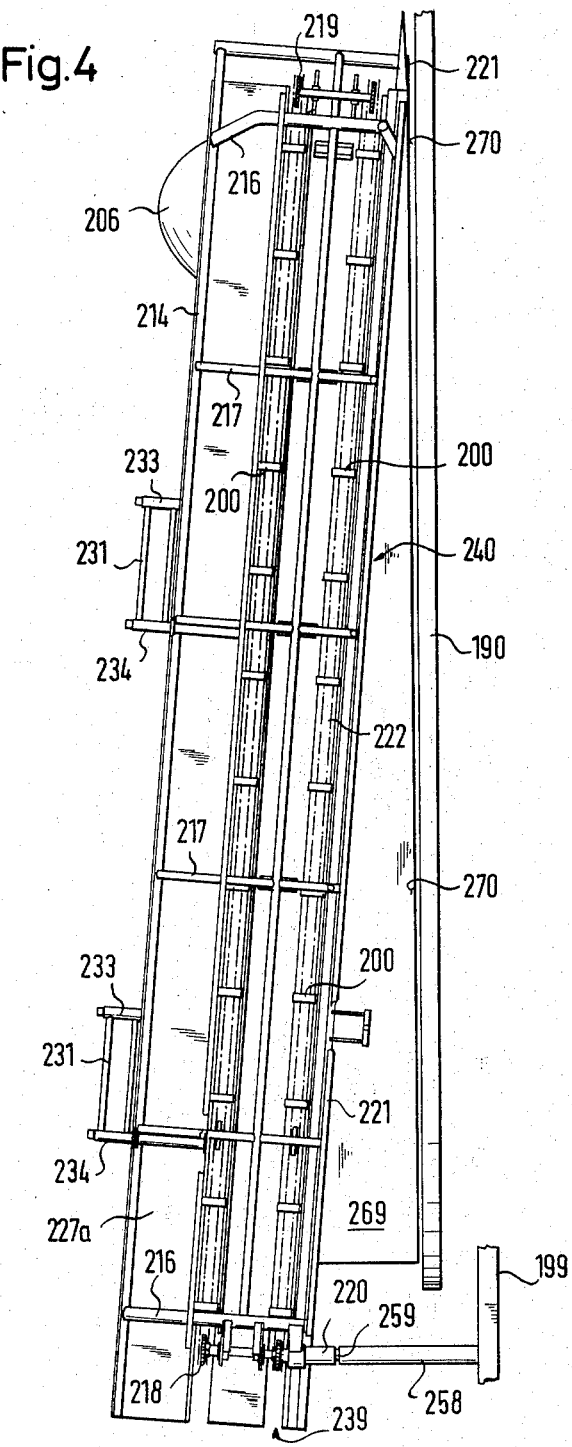
FIG. 4 shows a schematic side elevation of FIG. 1.
Figure 5:
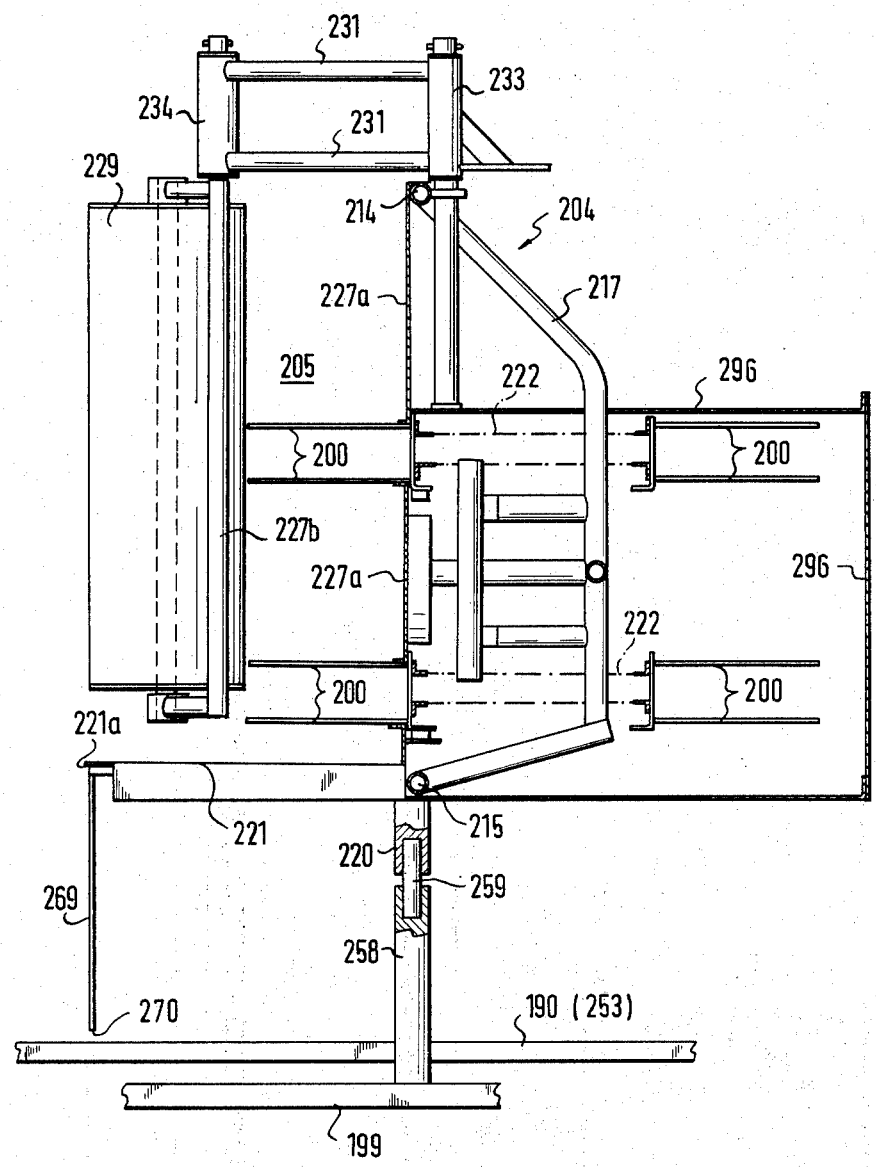
FIG. 5 shows a partial section of FIGS. 3 and 4.

The embodiment represented in FIGS. 3 to 5 in two partial views and a partial section differs from the preceding embodiments in that the conveyer 274 is designed as a conveying duct 205 which is engaged by prongs 200 of a conveyer chain 222 which rotates about vertical axles or rollers 218, 219 in such a way that its no-conveying strand rotates inside an upper or lateral cover 296 and the prongs pull out in the proximity of the transfer point 239 through slots of the duct wall 227a from the duct 205 and from the material contained there. The duct wall 227b opposite the duct wall 227a and substantially parallel thereto is suspended above the duct bottom 221 at a certain distance from the latter, freely rotating on swing levers 231 which are under the action of tension springs 232 these swing levers 231 being articulated both to the duct wall 227b on hinges 233, and to stirrups 226 of the boom 204 on hinges 234 in the manner of a parallelogram. On its edge facing the cutting disk 206 the duct wall 227b is provided with a roller 229 freely rotating or driven about a vertical axis and provided with prongs, if necessary, this roller 229 having the function of introducing the material severed by the cutting disk 206 from the rotating pile in an acute angle into the duct 205 and of preventing the material from getting stuck on the vertical edge of the wall 227b. The wall 227b separates in operation the derived material rope from the edge of the pile rotating in opposite direction.

The cutting disk 206 is mounted on a supporting arm 224 connected to the frame of the boom 204. It is driven over a back gear 225 by the driving motor 223, separate from the other units. The entire boom 204 and the conveyer 274 are mounted on a bearing block 258 in the proximity of the transfer point 239 at a higher level than that of the rotating bearing surface 190 for rotation about a vertical axis so that the boom 204 and the bottom 221 resp. of the conveying duct 205 is in the proximity of the cutting disk 206 in only a slight distance above the turntable, but rises from the end there in the direction of the transfer point 239 so that any following conveyer devices can be arranged without any difficulty below the transfer point 239 (see FIG. 4).

As it can be seen from FIGS. 3 to 5 the boom 204 consists of an upper supporting tube 214, a lower supporting tube 215, which are connected by straps 216, 217, between which are arranged the guide rollers 218 219 for the conveyer chain 222 and on which are provided the partial strips of the fixed duct wall 227a which leave slots free for the passage of conveyer elements.

On the end of the supporting tube 215 is rigidly mounted a bearing bush 220 which receives a journal 259 arranged on the bearing block 258 connected to the base about which the conveyer 204 can thus rotate because its other end bears on movable guide rollers.

Below the front edge 221a of the bottom 221 and extending from the end facing the cutting disk up to the proximity of the transfer point — as far as the boom 204 can move over the turntable 190 is a substantially vertical covering wall 269 which prevents the material to be conveyed from falling under the bottom 221 and being stuck there. According to the invention, the distance between the bottom edge 270 of the wall 269 and the surface of the turntable 190 is greatest at the end of the bottom 221 adjoining the cutting disk 206 because it narrows slightly in the direction toward the transfer point or end 239 so that the material touching the edge 270 in its longitudinal direction can pass by the edge 270 in the direction of the turntable 190 but can not get stuck at this end if individual stalks should detach themselves from the material rope before the material rope passes over to the duct bottom 221 which passage is effected by the pushing effect of the turntable and of the rotating pipe resp. and by the friction of the rope on the cutting disk 206. These stalks remain on the turntable, they can be stripped off at any point or be combined again with the pile.

The conveyer chains bear naturally between the guide wheels 218, 219 on guides on or along which they glide.

The boom 204 shown in FIG. 3 in its extreme position is turned about its fulcrum by a turning gear (not shown) connected with it by known means that it assumes at the end of the turning cycle the inner position represented in FIGS. 1 and 2. The rate of feed during the turning is increased from the outside to the inside, for example, corresponding to the course of a known control curve to the same extent as the circumference of the pile, which constantly decreases, due to the peeling, during the movement of the cutting disk 206 toward the center of the bearing surface 190. The thickness of the severed material rope is thus increased in the same ratio, so that about the same amount of material is fed to the following machine.

In a corresponding manner the speed of rotation of a rope of material of constant thickness could be adapted to the speed of the conveyer by constantly increasing the speed of rotation of the turntable in dependence on the position of the boom.

Above the inlet the duct can be arranged a pressure roller 203 revolving about a horizontal axis (FIG. 3).

Experience has shown that the turntable is made substantially without a circumferential wall and therefore can be so designed — in a strengthened form and buried in the ground — that a tractor or wagon can pass over it.

It suffices to provide a relatively short baffle on the side of the turntable facing the loading wagon in unloading position, which can be detachable and adjustable on a trestle. It prevents material from dropping laterally from the turntable when the latter is loaded.

Figure 6:
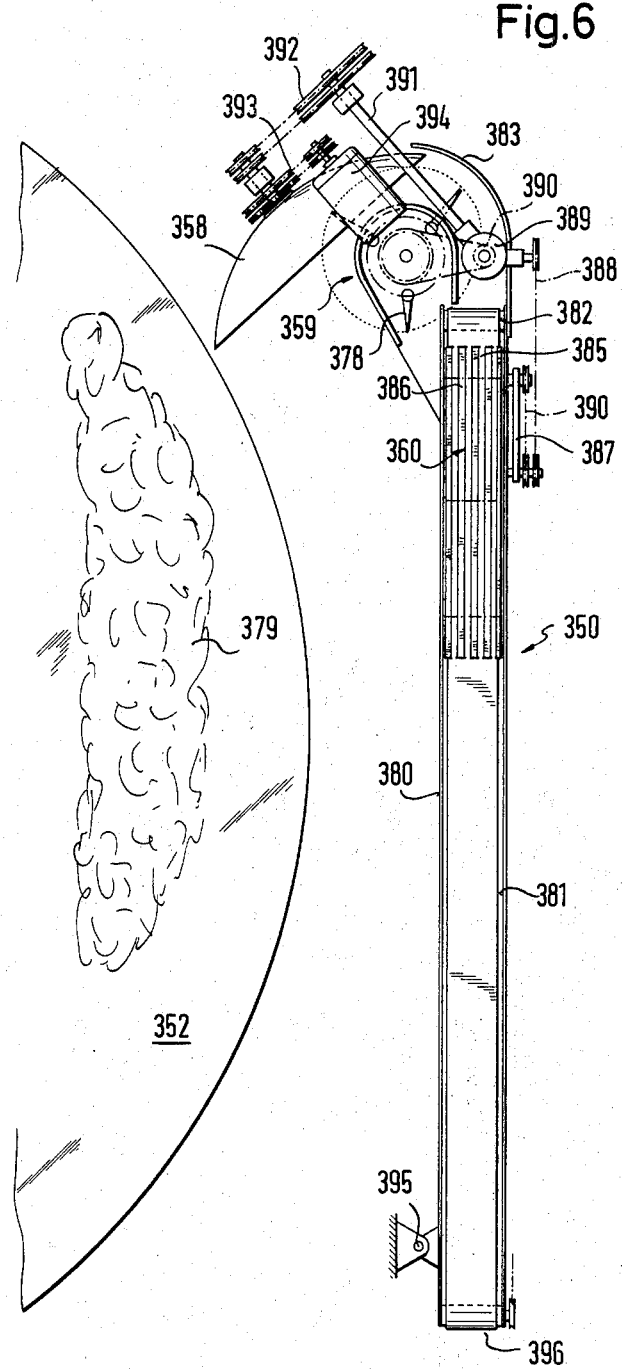
FIG. 6 shows a partial top view of an embodiment.

FIG. 6 shows a boom 350 in the position which it assumes at the start of the unloading of a transport vehicle or of a dosing device 352 onto the turntable. The boom turns on its fulcrum 395 about a substantially vertical axis and is suspended with its front part by means of an upright 400 (FIG. 7) on a gantry-type carrier 353 in this way that the uprights 400 carry rollers 351 which bear on the surface of the carrier 353. The boom 350 is provided with a deflecting conveying duct 383 which passes over into an outlet duct 380 whose outlet opening 396 is arranged in the proximity of the fulcrum 395.

In front of the inlet of the deflecting conveying duct 383 is arranged the dish-shaped cutting disk 358 which is driven by a motor 394 over a back gear 393 and whose shaft drives over an additional back gear 392 and on primary shaft 391 a miter gear 389 which drives over a back gear 390 a conveyer drum 359 whose prongs 378 dip into the edge of the revolving pile 379 ahead of the cutting disk 358 and which pull the material deflected by the cutting disk 358 from the pile 379 into the deflecting conveying duct 383 and push it up to the outlet duct 380 with bottom 381, starting at the guide roller 382 through which the material is conveyed by a chain- or belt conveyer up to the outlet opening 396. At the head of the outlet duct 380 is arranged a packing element 360 with prongs protruding into the duct which project through slots 385 of a cover 386 into the conveyer duct and which is driven over the chain backs gears 388, 390. The packing element is suspended movably by means of a rocker 387 on the outlet duct so that it can detach itself under the action of relatively large amounts of material. The prongs of the packing element pull themselves up by a known conveying drum control at the end of their track adjoining the outlet opening 396 and out through the slots 385 of the cover 386. Their track extends at their end facing the deflecting conveying duct at first upward, then downward and turns then finally into the horizontal, so that the relatively high and narrow material rope conveyed through the deflecting conveying duct can be deformed to a lower height and also slightly compressed so that it finds room in the slightly lower outlet duct and can be transferred trouble-free into the inlet openings of following devices, if any.

The chain- or belt conveyer (FIG. 7) in the outlet duct 380 is driven over an electromotor 397 and two back gears 398, 399. The guide roller 382 has a smaller distance from the bottom of the pedestal 364 and of the turntable 352 resp. arranged at the same level. The bottom 381 of the outlet duct rises however in the direction of its outlet opening 396 and the likewise somewhat higher fulcrum 395, so that the material can be readily transferred to receiving troughs of conveyers processing machines arranged underneath.

Figure 7:
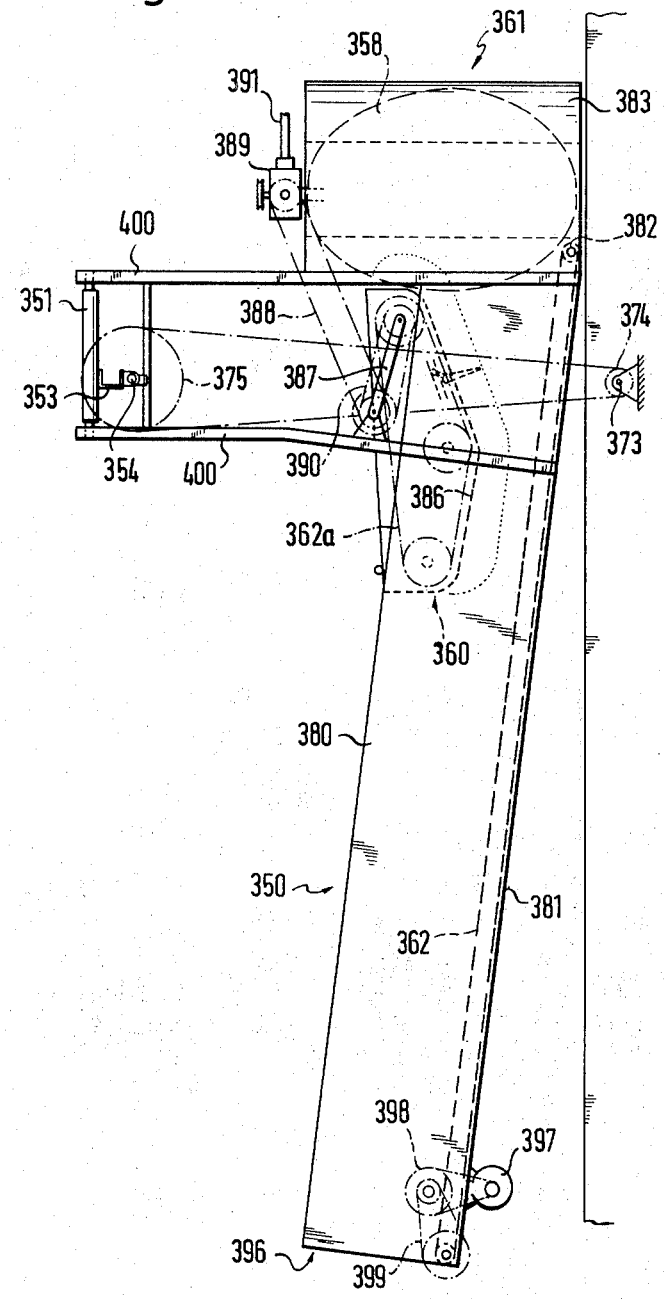
FIG. 7 shows a partial side elevation of FIG. 6.

FIG. 7 shows the packing element 360 with a chain conveyer 362a which has controlled prongs. The prongs describe the path represented by dotted lines, first from the top to the bottom, then obliquely downward and finally substantially horizontally.

On the outlet duct are arranged the uprights 400 which carry rollers 351 which run on the surface of the gantry-type carrier 353. In the lower part of the gantry-type carrier a spindle 354 is mounted which is driven over a belt pulley 375 from a belt pulley 374, which is arranged on the extension 373 of the worm shaft of a worm gear 369 (FIG. 8).

Figure 8:
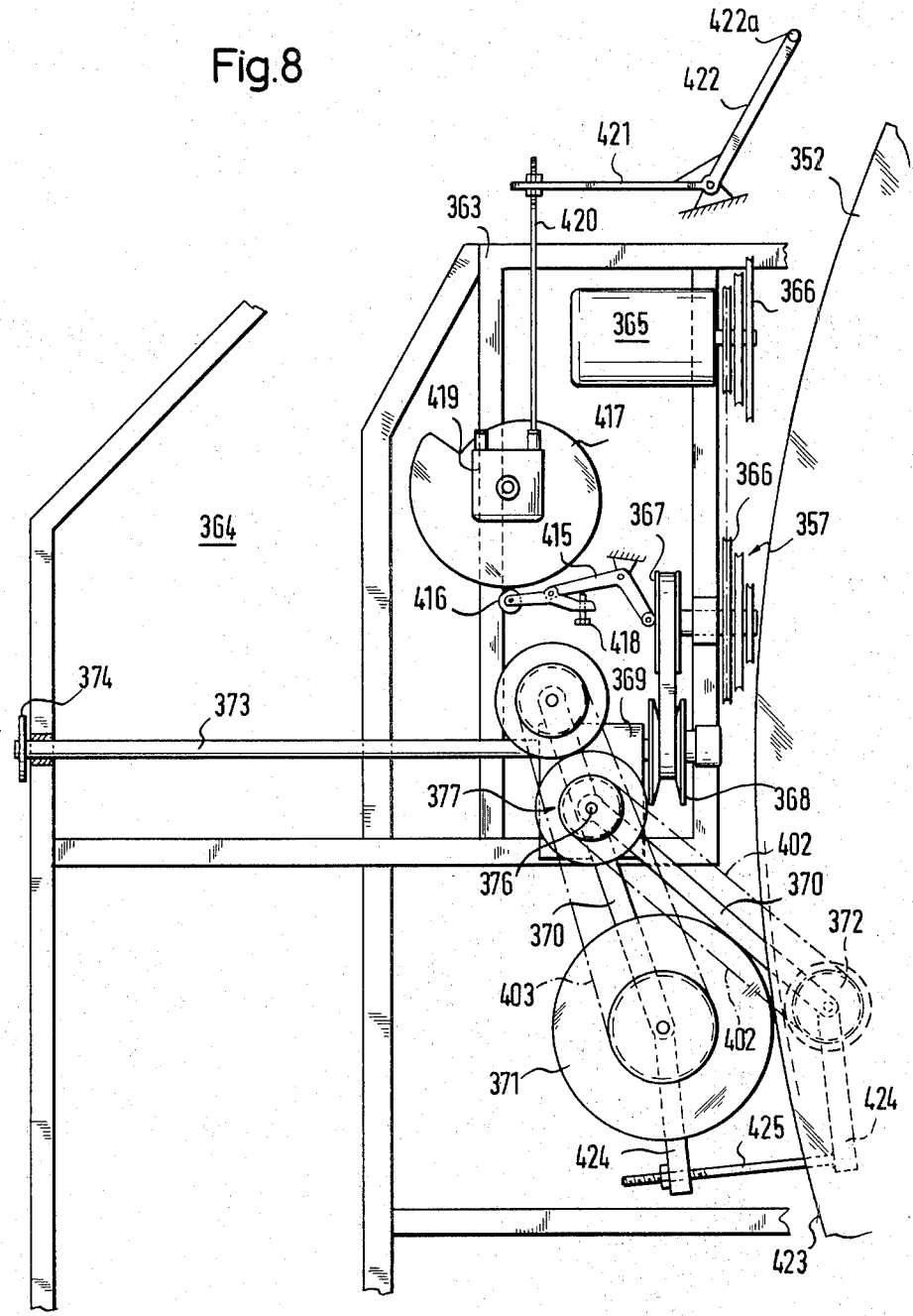
FIG. 8 shows a partial top view of the driving unit of an embodiment.

As can be seen from FIG. 8 the primary shaft of the worm gear 369 is driven by variable speed pulleys 367 and 368 connected by means of a V-belt, of which one is driven over a step back gear 357, 366 with variable speed by an electromotor 365. The variable speed pulley 367 is pulled apart in a known manner by a spring parallel to its axis and compressed by a toggle lever 415 which bears over a roller 416 on a cam disk 417. The toggle lever 415 is divided so that it can be adjusted by the screw 418 to the cam 417 free from play. The cam disk itself is turned by a transmitter-cell 419 rigidly connected with it which actuates a tension means 420 which is actuated by the boom 350 either by hand or over a swing lever 421, 422 in this way that the boom 350 carries along the top end 422a and thus turns the cam disk over the tension means 420 and the transmitter cell 419 so that, when the boom 350 turns inside, the speed of the primary shaft of the worm gear 369 is automatically increased to the extent as the circumferential speed of the decreasing pile on the turntable diminishes. The swing lever 421, 422 can also be operated independent of the boom 350 by hand. After the boom 350 has reached the innermost position, it remains in this position so that it can always perform the return movement into the starting position shown in FIG. 1 at a high speed. The speed of this return movement is further increased by the fact that the motor 365 is designed as motor with commutable poles which runs at twice the speed during the return as during the forward run. The driven shaft 376 of the worm gear 369 drives over back gears 402 and 403 the friction roller 371 movably mounted on the rocker 370 and the counter roller 372 resp. with opposite direction of rotation and corresponding speed, which set the edge 423 of the turntable 352 in motion. This drive is only effective during the turning movement of the boom 350 from the outside to the inside because a freewheeling device 377 is installed in the worm gear 369 on the shaft 376. The extensions 424 of the rocker 370 are pulled apart by an adjusting screw 425 so that the necessary pressure of the friction roller 371, made primarily of elastic material or designed as a pneumatic tire, is ensured on the turntable 423. The rockers 370 still permit adaptation of the friction roller 371 and of the counter wheel 372 to a substantially unround edge 423 of the turntable so that a simple inexpensive and safe drive of the turntable is ensured.

FIG. 9 shows that the gantry-type carrier 353 is arranged with one end on a support 409 and with the other end on a post 408 which passes through the center column 407 of the turntable 352 and is rigidly connected with the base 406 of the turntable. The turntable rests on rollers 410 on the base 406. The base 406 is connected to the pedestal 364 in the frame of which is mounted the shaft 373 which drives over the belt pulley 374 the belt pulley 375 which is connected to the spindle 354. The spindle nut 355 is connected with the bar 356 to the upright 400 and thus also to the outlet duct in which the packing element 360 operates as well as to the deflecting conveying duct rigidly connected with the latter. On the upright 400 are secured the rollers 351 which run on the surface of the carrier 353. On the carrier 353 are secured adjustable limit switches 404 and 405 to which the limit switch 405 always shuts off the drive of the spindle 354 when the boom 350 has been turned from the inside to the outside into its starting position shown in FIG. 6. The limit switch 404 becomes operative when the boom 350 has reached the inner end position in which the cutting disk 358 comes as close as possible to the center column 407. It shuts off at first the drive of the spindle 354 and switches then immediately with the double speed to reverse so that the return movement of the boom 350 is not always effected with the maximum speed.

FIG. 10 shows the turntable 352 with a baffle 414 suitable for filling, and also the center column 407, the post 408, and the gantry-type carrier 353 on which run the rollers 351. The boom 350 carrying the cutting disk 358, the deflecting conveying duct 383 and the outlet duct 380 as well as the packing element 360, is rotatably suspended on the fulcrum 395. The outlet opening 396 of the outlet duct 380 opens into the receiving trough 411 of a blower 412 which conveys the received material through the pipeline 413. Instead of the blower 412, a pivotally mounted conveyor belt connected to the outlet openings 396, which feeds the material to different stationary processing-or transport devices, for example, a blast chopper conveyor belt, stationary press, briquetting press etc. which are used alternately but which can also remain on the spot during the time when they are not used. This saves considerable setting time which was heretofore unavoidable for resetting conveyor and processing machines.

What is claimed is:

1. Apparatus for cutting and removing a rope-like section of material from a pile of material comprising a rotatable turntable for supporting the pile of material, a boom arranged to swing over the surface of said turntable, and a cutting member mounted on said boom for removing the rope-like section of material, wherein the improvement comprises means forming a pivot axis for said turntable, said boom being elongated and pivotally mounted on said means adjacent one of its ends with said cutting member mounted on said boom adjacent its end opposite the pivoted end, a conveyor device mounted on said boom for movement therewith, said conveyor device having an inlet end located adjacent said cutting member and an outlet end located adjacent the pivoted end of said boom, a turning gear in operative engagement with said boom for pivoting said boom so that said cutting member mounted on its end opposite said pivoted end can swing in a path from the other circumferential periphery of said turntable to its center for cutting a continuous rope-like section from the pile of material on said turntable.

2. Apparatus, as set forth in claim 1, wherein said conveyor device comprises at least one endless chain and prongs secured to and extending outwardly from said chain.

3. Apparatus, as set forth in claim 1, wherein said conveyor device comprises at least one conveyor screw.

4. Apparatus, as set forth in claim 1, wherein a linkage interconnects said boom to said turning gear.

5. Apparatus, as set forth in claim 4, comprising a drive for said turntable, a disconnectable reduction gear in driving engagement between said drive for said turntable and said turning gear for said boom.

6. Apparatus, as set forth in claim 1, wherein said conveyor device comprises a conveying duct mounted on said boom and extending from the inlet end to the outlet end of said conveyor device.

7. Apparatus, as set forth in claim 6, wherein said conveyor device comprises an endless conveyor member, support members arranged in spaced relationship, said conveyor member arranged over said support members, and said support members located at the opposite ends of said conveying duct and the axes of said support members arranged vertically.

8. Apparatus, as set forth in claim 1, wherein guide rollers are arranged to support the end of said boom opposite the end which is pivotally mounted.

9. Apparatus, as set forth in claim 8, wherein a stationary pedestal is arranged adjacent to said turntable and is arranged at the same level as said turntable and serves as a track for said guide rollers.

10. apparatus, as set forth in claim 1, wherein driving means are arranged in operative engagement with said turning gear for driving it at regulable and progressive rates of feed.

11. Apparatus, as set forth in claim 10, including means for manually driving and disconnecting said turning gear.

12. Apparatus, as set forth in claim 1, wherein a supporting arm is mounted on the end of said boom opposite its pivoted end and extends angularly outwardly from said boom and supports said cutting tool so that the cutting edge of said cutting tool is located outwardly from and adjacent the end of said boom opposite its pivoted end.

13. Apparatus, as set forth in claim 6, wherein said means forming a pivot axis for said boom is located at a level spaced above the plane of the turntable and said conveying duct on said boom extends upwardly from the end spaced opposite the pivot axis to the end adjacent the pivot axis.

14. Apparatus, as set forth in claim 1, including a switching device in operative engagement with said turning gear, said turntable and said conveyor device on said boom for automatically stopping the rotation of said turntable and movement of said conveyor device in dependence on the position of said cutting tool relative to the center of said turntable.

15. Apparatus, as set forth in claim 6, wherein said conveying duct having slots in its side walls, said conveyor device including an endless conveyor member having prongs extending outwardly therefrom, with said prongs projecting through the slots in the side walls of said conveyor duct.

16. Apparatus, as set forth in claim 6, wherein said conveying duct has its transverse cross sectional shape in the form of an upright rectangle.

17. Apparatus, as set forth in claim 6, wherein a pressure roller mounted for rotation about a substantially horizontal axis is positioned above the inlet opening of said conveying duct facing said cutting tool.

18. Apparatus, as set forth in claim 1, including drive means for jointly driving said conveyor device and said turntable from the same power source, and means for operating said cutting tool so that it can be connected and disconnected separately from said drive means for said conveyor device and said turntable.

19. Apparatus, as set forth in claim 1, comprising a gantry type carrier stationarily positioned radially outwardly from the circumferential periphery of said turntable, rollers supported on said gantry type carrier and arranged to support the end of said boom opposite its pivoted end, a driven spindle mounted on said gantry type carrier, a spindle nut associated with said driven spindle, a rod connected to said boom and to said spindle nut.

20. Apparatus, as set forth in claim 19, wherein a speed adjusting mechanism is connected to said turning gear for said boom.

21. Apparatus, as set forth in claim 20, wherein a conveying drum is associated with said cutting tool and a packing element positioned behind said cutting tool in the path of movement of the cut material to said conveying device, and said packing element arranged to reduce the height of the cut material and to transfer it to said conveyor device.

22. Apparatus, as set forth in claim 19, including a pedestal mounted alongside the periphery of said turntable, a detachable frame mounted within and protected by said pedestal, drive means for said conveyor device associated with said detachable frame, and said drive means including at least one electromotor, a step pulley V-belt reduction gear, two variably spaced speed pulleys, a worm gear, a rocker, a friction roller mounted on said rocker, and a counter roller associated with said friction roll.

23. Apparatus, as set forth in claim 1, wherein said conveying device is a worm gear having an extension on its worm shaft, a belt pulley connected to the extension of said worm shaft, a counterpulley in driving connection with said belt pulley, a gantry type carrier mounted alongside the periphery of said turntable, and an adjusting spindle mounting said counterpulley.

24. Apparatus, as set forth in claim 23, wherein a driving motor is arranged for driving said adjusting spindle, a driven shaft on said driving motor, a freewheeling device associated with said driven shaft, and said driving motor arranged as a two-stage motor switchable in two directions of rotation for driving said adjusting spindle at a higher speed when switched to reverse for returning said boom to its starting position adjacent the circumferential outer periphery of said turntable while the other parts of the drive arrangement for said turntable are rendered temporarily inoperative by said freewheeling device.

25. Apparatus, as set forth in claim 21, wherein several rows of controlled prongs are mounted on said conveying drum and said prongs extend forwardly of said cutting tool into the outer edge of the pile of material on said turntable for pulling the material in front of said conveying ducts.

26. Apparatus, as set forth in claim 25, wherein said conveying member in said conveying duct having a guide roller positioned immediately behind the path of said prongs on said conveying drum and a deflecting conveying duct associated with said cutting disc and open in the range of the bottom of said cutting disc is positioned rearwardly of the cutting disc for directing the material into said conveying duct.

27. Apparatus, as set forth in claim 26, wherein a packing element is associated with said conveying duct and includes an endless member having prongs projecting outwardly therefrom with said endless member rotating about an axis arranged horizontally and transversely to the direction of passage through said conveyor duct and arranged for reducing the height of the rope-like section of material removed by said cutting tool for directing the material through said conveying duct.

28. Apparatus, as set forth in claim 27, wherein said conveying duct is a multiple of the length of said packing element, said conveying duct having a cover with slots therethrough, and said prongs on said packing element extending through the slots in said cover of said conveying duct.

29. Apparatus, as set forth in claim 28, including means associated with said packing element for providing limited vertical adjustment of said packing element so that it can be displaced upwardly under the influence of large amounts of material introduced into said conveying duct.

30. Apparatus, as set forth in claim 1, wherein said conveyor device comprises at least an endless belt, and prongs secured to and extending outwardly from said endless belt.

* * * * *

UNITED STATES PATENT OFFICE
CERTIFICATE OF CORRECTION

Patent No. 3,822,617    Dated July 9, 1974

Inventor(s) Ernst Weichel

It is certified that error appears in the above-identified patent and that said Letters Patent are hereby corrected as shown below:

In the heading of the patent, insert:

--[30]    Foreign Application Priority Data

September 23, 1971 Germany.......P 21 47 571.8
    May 25, 1972       Germany.......P 22 25 502.3.--

Signed and sealed this 3rd day of December 1974.

(SEAL)
Attest:

McCOY M. GIBSON JR.            C. MARSHALL DANN
Attesting Officer              Commissioner of Patents